Sept. 2, 1924.   1,506,857
T. E. McSHAFFREY ET AL
ANTISKID DEVICE
Filed Oct. 8, 1921
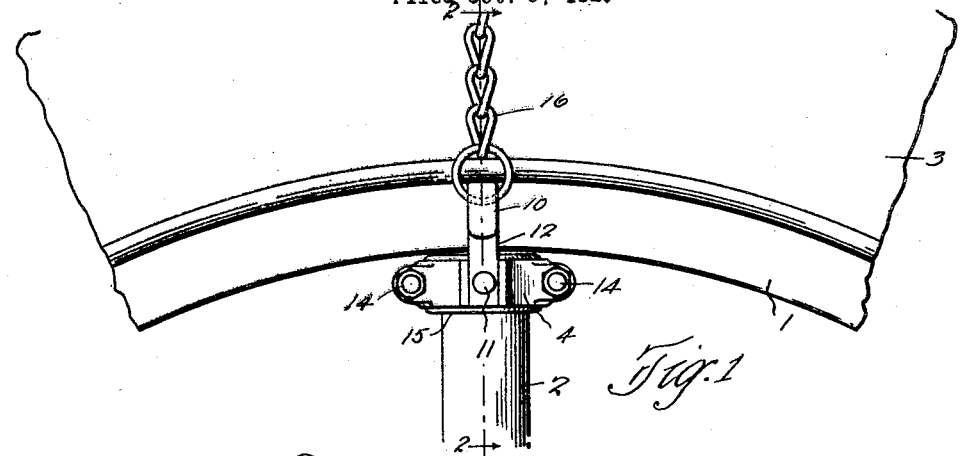
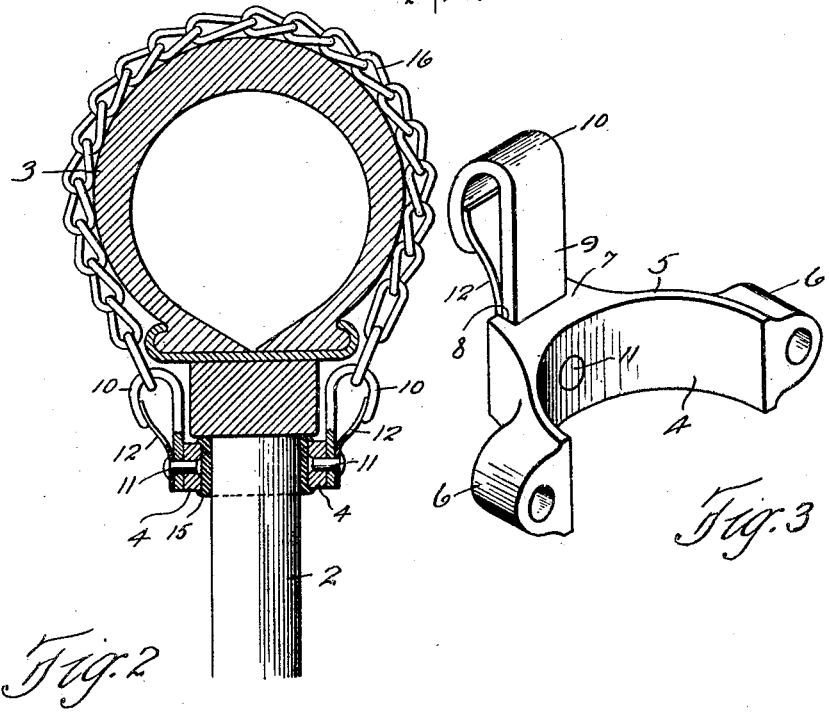
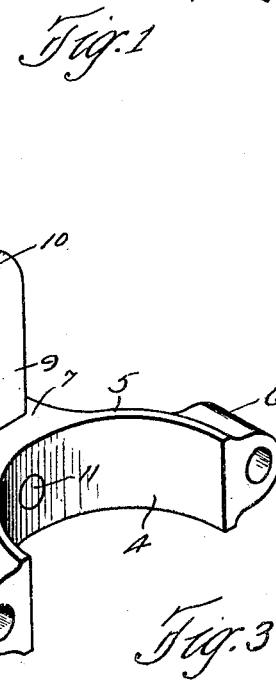

Patented Sept. 2, 1924.

1,506,857

UNITED STATES PATENT OFFICE.

THOMAS E. McSHAFFREY AND CHARLES F. GILBRIDE, OF AKRON, OHIO.

ANTISKID DEVICE.

Application filed October 8, 1921. Serial No. 506,248.

*To all whom it may concern:*

Be it known that we, (1) THOMAS E. McSHAFFREY, (2) CHARLES F. GILBRIDE, citizens of the United States, residing at Akron, in the county of Summit and State of Ohio, have invented a certain new and useful Improvement in Antiskid Devices, of which the following is a full, clear, and exact description, reference being had to the accompanying drawings.

This invention relates to anti-skid devices and has particular reference to devices of this character which are suitable for use on rubber tired vehicles, such as automobiles and motor trucks.

Some of the objects of the present invention are to provide an anti-skid device which may be easily and quickly applied or removed from the vehicle wheel and which, when in position, shall be effective in preventing skidding of the vehicle; to provide a device of this character which shall be exceedingly simple in construction, strong and durable, and inexpensive to manufacture, while further objects and advantages will appear as the description proceeds.

In the accompanying drawing wherein we have shown one form of our invention, Fig. 1 is a fragmentary side elevation of an automobile wheel fitted with one of our anti-skid devices; Fig. 2 is a sectional view taken on the line 2—2 of Fig. 1; and Fig. 3 is a perspective view of a half of one of the spoke collars.

Describing by reference characters the various parts illustrated, 1 denotes the felly of a wheel, 2 the spokes, and 3 a pneumatic tire. These parts may be of the usual or any approved construction.

Secured about a selected number of the spokes, or about all if conditions require it (one being shown in the drawing as sufficient for illustrative purposes), are spoke collars made up of halves 4, 4 which are identical in construction and hence are interchangeable. Each half collar 4 is composed of a semi-cylindrical body portion 5 which is formed at each end with a fastening lug 6, and intermediate said lugs, with an integral projection 7. The projection 7 is slotted as indicated at 8, to receive the shank 9 of a hook 10. A rivet 11 extends through a spring tongue 12, shank 9 and projection 7 and secures said parts in tight relationship thereby to constitute of the hook and tongue a snap of common form.

Each collar is clamped about its respective spoke adjacent the felly by means of suitable bolts, indicated at 14, and a bushing 15 of soft compressible material, such as rubber or leather is interposed between the spoke and the halves 4 of the collar, to prevent chafing of the spoke. The bushings 15 are shown as having end beads to secure them against dislodgment.

The collars are positioned on the spokes so that the snap hooks 10 project outwardly on opposite sides of the felly in transverse alignment. A chain 16 or other suitable traction element extends transversely over the tire and has its ends engaged over the snap hooks of each collar, as clearly shown in Fig. 2.

As hereinbefore stated, collars may be clamped to all the spokes, or to any desired number of them, as for example, to alternate spokes of the wheel; and as these collars do not interfere with the removal of the rim or tire from the wheel it is intended that they remain on the spokes at all times. Removal of the anti-skid elements is easily accomplished as it is only necessary to disengage the ends of the chain from the snap hooks. With the wheel equipped with its prescribed allotment of collars, any number of anti-skid elements or chains (up to the number of collars) may be applied to the wheel according to the conditions under which they are to be used.

Having thus described our invention, what we claim is:

1. A device of the character set forth comprising a pair of substantially semi-cylindrical members adapted to be secured about the spoke of a wheel, lugs projecting from the ends of each of said members, a bolt extending through the corresponding lugs of the opposed members, a nut threaded on each bolt and adapted to draw said members together about said spoke, a projection formed on each member intermediate the lugs thereof, a snap hook extending outwardly from each member and having a shank riveted to said projection, and a traction element engaged over the tread of the wheel and having its ends secured to said snap hooks.

2. A device of the character set forth comprising a pair of substantially semi-cylindrical members adapted to be secured about the spoke of a wheel, lugs projecting from the ends of each of said members, fastening means extending through the corresponding lugs of the opposed members, a projection formed on each member intermediate the lugs thereof, said projections being slotted and each having a snap hook positioned therein, and a traction element engaged over the tread of the wheel and having its ends secured to said snap hooks.

In testimony whereof, we hereunto affix our signatures.

THOMAS E. McSHAFFREY.
CHARLES F. GILBRIDE.